(12) United States Patent
Maniatis et al.

(10) Patent No.: US 9,813,194 B2
(45) Date of Patent: Nov. 7, 2017

(54) FEEDBACK IN A COMMUNICATION SYSTEM (71) Applicant: Nokia Solutions and Networks Oy, Espoo (FI)

(72) Inventors: Ioannis Maniatis, Unterensingen (DE); Hans Kroener, Geislingen (DE)

(73) Assignee: Nokia Solutions and Networks Oy, Espoo (FI)

( * ) Notice: Subject to any disclaimer, the term of this patent is extended or adjusted under 35 U.S.C. 154(b) by 47 days.

(21) Appl. No.: 14/896,955

(22) PCT Filed: Jun. 12, 2013

(86) PCT No.: PCT/EP2013/062139
§ 371 (c)(1),
(2) Date: Dec. 9, 2015

(87) PCT Pub. No.: WO2014/198311
PCT Pub. Date: Dec. 18, 2014

(65) Prior Publication Data
US 2016/0156435 A1 Jun. 2, 2016

(51) Int. Cl.
*H04L 12/26* (2006.01)
*H04L 1/18* (2006.01)
*H04L 1/00* (2006.01)

(52) U.S. Cl.
CPC ............ *H04L 1/18* (2013.01); *H04L 1/0015* (2013.01); *H04L 1/0026* (2013.01); *H04L 1/0036* (2013.01); *H04L 1/0048* (2013.01)

(58) Field of Classification Search
CPC .... H04W 24/00; H04L 43/50; H04L 43/0852; H04L 43/08; H04L 2012/5625; H04L 49/3081; H04L 47/10; H04L 12/5615; H04L 12/5601; H04L 12/5602; H04L 5/003; H04L 1/18; H04L 1/0015; H04L 1/0026; H04L 1/0036; H04L 1/0048; H04B 17/003
USPC ............ 370/252, 236, 431, 328, 338, 310, 2
See application file for complete search history.

(56) References Cited

U.S. PATENT DOCUMENTS

| 2009/0067391 A1* | 3/2009 | Shen ...................... H04L 1/0027 370/336 |
| 2011/0237272 A1* | 9/2011 | Gorokhov .............. H04B 7/024 455/452.1 |
| 2012/0082052 A1 | 4/2012 | Oteri et al. ................... 370/252 |

FOREIGN PATENT DOCUMENTS

WO   WO 2013/087113 A1   6/2013

OTHER PUBLICATIONS

3GPP TSG RAN WG1 Meeting #63bis, Dublin, Ireland, Jan. 17-21, 2011, R1-110380, "Considerations on measurement mismatch problem", LG Electronics, 5 pgs.
3GPP TSG-RAN WG4 2010 AH#4, Oct. 11-15, 2010, Xi'an, China, R4-103791, "eICIC CSI feedback requirements", Qualcomm Inc., 2 pgs.

(Continued)

*Primary Examiner* — Brenda H Pham
(74) *Attorney, Agent, or Firm* — Harrington & Smith (57) ABSTRACT

A method and apparatus relating to feedback in a communication system. The method includes receiving feedback relating to a transmission slot; and subsequently determining the type of transmission slot the feedback relates to.

23 Claims, 6 Drawing Sheets

(56) References Cited

OTHER PUBLICATIONS

ETSI TS 136 213 V10.1.0 (Apr. 2011) "LTE; Evolved Universal Terrestrial Radio Access (E-UTRA); Physical layer procedures (3GPP TS 36.213 version 10.1.0 Release 10)"; 117 pages; European Telecommunications Standards Institute (ETSI); 650, Route des Lucioles; F-06921 Sophia-Antipolis; France.
3GPP TS 36.300 V10.3.0 (Mar. 2011) "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)"; 197 pages; 3rd Generation Partnership Project (3GPP); Mobile Competence Centre; 650, Route des Lucioles; F-06921 Sophia-Antipolis Cedex; France.

\* cited by examiner

FEEDBACK IN A COMMUNICATION SYSTEM

This disclosure relates to feedback in a communication system.

A communication system can be seen as a facility that enables communication sessions between two or more entities such as fixed or mobile communication devices, base stations, servers and/or other communication nodes. A communication system and compatible communicating entities typically operate in accordance with a given standard or specification which sets out what the various entities associated with the system are permitted to do and how that should be achieved. For example, the standards, specifications and related protocols can define the manner in which various aspects of communication shall be implemented between communicating devices. A communication can be carried on wired or wireless carriers. In a wireless communication system at least part of the communications between stations occurs over a wireless link.

Examples of wireless systems include public land mobile networks (PLMN) such as cellular networks, satellite based communication systems and different wireless local networks, for example wireless local area networks (WLAN). A wireless system can be divided into cells or other radio coverage or service areas. A radio service area is provided by a station. Radio service areas can overlap, and thus a communication device in an area can typically send signals to and receive signals from more than one station.

A user can access the communication system by means of an appropriate communication device. A communication device of a user is often referred to as user equipment (UE) or terminal. A communication device is provided with an appropriate signal receiving and transmitting arrangement for enabling communications with other parties. Typically a communication device is used for enabling receiving and transmission of communications such as speech and data. In wireless systems a communication device provides a transceiver station that can communicate with another communication device such as e.g. a base station and/or a user equipment.

An example of communication systems is an architecture that is being standardized by the 3rd Generation Partnership Project (3GPP). This system is often referred to as the long-term evolution (LTE) of the Universal Mobile Telecommunications System (UMTS) radio-access technology. A further development of the LTE is often referred to as LTE-Advanced. The various development stages of the 3GPP LTE specifications are referred to as releases.

A communication system can be provided with error correction functionality, such as with a possibility of requesting for retransmission of any information that the recipient could not successfully decode. For example, the 3GPP LTE uses a hybrid automatic repeat request (HARQ) error control mechanism. The error control mechanism can be implemented such that a device which receives either a positive or a negative acknowledgement (ACK/NACK) or other indication from another device of an error free or erroneous receipt of transmitted data can take appropriate action. Typically this means resending of a protocol data unit to the receiving device in response to a negative acknowledgement. In LTE the acknowledgement signalling can be communicated on a physical HARQ indicator channel (PHICH) based on a HARQ timing scheme. A communication system may employ a feedback mechanism in which information relating to the quality of a particular communication link is provided to an entity able to determine and/or set communication parameters to be used on that link. HARQ feedback is used to determine Block-Error-Rates (BLERs). BLERs are, in turn, used as a link quality measure by a network node for Multiple-Input-Multiple-Output (MIMO) mode control and link adaptation. MIMO mode control is used to control the processing of information received on multiple antennae.

A communication system can comprise different types of radio service areas providing transmission/reception points for the users. For example, in LTE-Advanced the transmission/reception points can comprise wide area network nodes such as a Macro eNode B (Macro-eNB) which may, for example, provide coverage for an entire cell or similar radio service area. Network nodes can provide coverage for a small or local radio service area, for example, network nodes such as Home eNBs (HeNB, sometimes called femto-eNB), pico eNodeBs (pico-eNB), micro eNodeBs (micro-eNB) or femto nodes. Network nodes that are configured to provide coverage for a smaller radio service area than a Macro-eNB are hereinafter termed small-eNBs. Examples of possible small-eNBs include HeNBs, pico-eNBs and femto nodes. Some applications utilise radio remote heads (RRH) that are connected to network nodes providing coverage. Different radio technologies may be used at the same time in a multi-layered system. Multi-layered systems are often referred to as heterogeneous networks or Hetnets. An example of a multi-layered system is a mixture of macro base stations (Macro-eNBs) and lower power base stations (e.g. small-eNBs such as pico and micro stations). The various layers can be deployed as part of a cellular network. It is noted that a multi-layer LTE network is used herein only as an example of multi-layered systems and that other solutions are also possible.

Hetnets are evolving to what are termed herein as "denser networks", or networks where multiple nodes are densely deployed to serve devices in the area. A good user experience and high data rate requirement from the communication devices are of high importance in such networks. In a denser network the number of infrastructure nodes can be larger or equal to the number of the communication devices such as UEs. A communication device can also be served by multiple nodes or cells. These multiple nodes in a neighbourhood shall have a good coordination, and typically form a cluster. A cluster head may be provided as a central controller handling the coordination and negotiations among the nodes. The cluster head could be a separate network entity, or could be logically or physically located inside any of the nodes.

The smaller radio service areas can be located wholly or partially within the larger radio service area. A UE may thus be located within more than one radio service area and hence communicate with more than one network node using respective communication links. The service areas may also be of different type. This can cause interference in communications governed by network nodes providing overlapping service areas.

The 3GPP Release 10 specifications developed two approaches to address this type of interference: one in the frequency domain (carrier-aggregation); and one in the time domain (protected subframes). The following concentrates on time domain (TDM) enhanced inter-cell interference coordination (eICIC) using protected subframes. However, we note that similar issues may arise in the frequency domain (as described briefly later). In TDM eICIC, an aggressor cell creates protected subframes for a victim cell by reducing its transmission activity in certain subframes. The aggressor cell reduces the transmission activity by transmitting partially muted subframes (e.g. an Almost Blank Subframe (ABS), see 3GPP Release 10 Specification 136 213, version 10.1.0). The concept of ABSs and what is transmitted during these is described in more detail, for example, in 3GPP TR 36.300, Version 10.3.0 of March 2011. Throughout the following, a regular data subframe is termed a non-Almost Blank Subframe (non-ABS) and a partially muted subframe is termed an ABS. An ABS commonly comprises less information and/or is transmitted using a lower power than a regular data subframe. For the UE communicating with the victim cell, this reduction in transmission activity results in the UE experiencing less interference than it would have experienced had the aggressor transmitted a regular data frame instead. The TDM eICIC concept thus provides coordination mechanisms for enabling reduction in downlink interference caused by an aggressor cell to a victim cell. Two exemplifying cases are mentioned to illustrate this.

1. A case in which a Pico-eNB is operating in a Macro-eNB service area: the Pico-eNB forms the victim cell and the Macro-eNB forms the aggressor cell. The Macro-eNB may transmit an ABS. The transmission of such an ABS results in a user equipment connected to the pico-eNB experiencing less interference than it would have experienced had a non-ABS been used instead at that time. This reduction in interference increases the Signal to Interference and Noise Ratio (SINR), which increases the channel capacity and hence the data rate. Further, transmission of an ABS may improve the results of any cell range expansion mechanisms employed by the pico-eNB to extend its associated coverage area (a possible range expansion mechanism biases a UE to remain in a connected mode with the pico-eNB regardless of whether the Macro-eNB downlink (DL) connection has better conditions). Typical reasons for extending the coverage area of the pico-eNB are: better uplink link budget; and more efficient use of system resources.

2. A case in which a HeNB is operating in a Macro-eNB service area: the Macro-eNB is the victim cell and the aggressor cell is a closed subscriber group (CSG) HeNB. The HeNB can apply some time domain muting patterns (e.g. a predetermined pattern of transmitted ABSs and non-ABSs) to give user equipment within the coverage area of the CSG HeNB the chance of successfully receiving communications from the Macro-eNB. In this way, all macro connected UEs can be connected to the Macro-eNB and avoid experiencing a coverage hole.

The downlink TDM muting patterns can be indicated to user equipment through dedicated signalling that provides information on which type of subframes in the time domain are to be used for which purpose. As mentioned above, one possibility for muting patterns is to use a predetermined pattern of ABSs and non-ABSs. During an ABS, an aggressor may transmit only limited information, such as information vital to the operation of the system. Examples of information vital to the system include reference symbols, synchronization sequences, broadcast channels, and so on. During an ABS, an aggressor may transmit at a lower power than the aggressor would use for a non-ABS. A bit map pattern, used to indicate the ABS pattern, may be exchanged between the Macro-eNB and a small-eNB through an X2 message. Thus under the current eICIC schemes, the Macro-eNB transmits ABSs and non-ABSs according to a predefined pattern to guarantee the user equipment performance in a small-eNB cell.

ABSs were introduced into 3GPP for LTE in Release 10. To complement the use of ABSs by network entities such as Macro-eNBs, Femto nodes and pico-eNBs, Release 10 also specified certain measurement restrictions that could be imposed on a UE communicating with a network entity. These measurement restrictions allow a network entity to configure a UE to provide feedback on both the serving network node and adjacent network nodes for exclusively ABS or exclusively non-ABS communications. The configuration instructions sent to the UE for this purpose may contain instructions to modify at least one of measuring or reporting of feedback information, such as Radio Resource Measurements (RRM), Radio Link Measurements (RLM) and Channel Status information (CSI) so as to obtain measurements relating to only a certain type of subframe i.e. ABS or non-ABS. This means that a UE operating in accordance with Release 10 of 3GPP for LTE should comprise programming that enables the UE to distinguish between ABSs and non-ABSs when so configured. Previous Releases (i.e. Releases 8 and 9) did not comprise ABSs and so UEs operating in accordance with any of these previous Releases (the "legacy UEs") do not comprise programming that enables them to be configured to distinguish between ABSs and non-ABSs when instructed to do so by a network device. In other words, the legacy UEs may be called ABS-agnostic.

As legacy UEs are ABS-agnostic, this leads to:
A smaller possible cell range expansion for legacy UEs compared to non-legacy UEs; and
Inaccuracies with respect to the feedback provided by the legacy UEs, particularly the Channel Status information (CSI) and the therein included Channel Quality Indicator (CQI).

Figure 4:
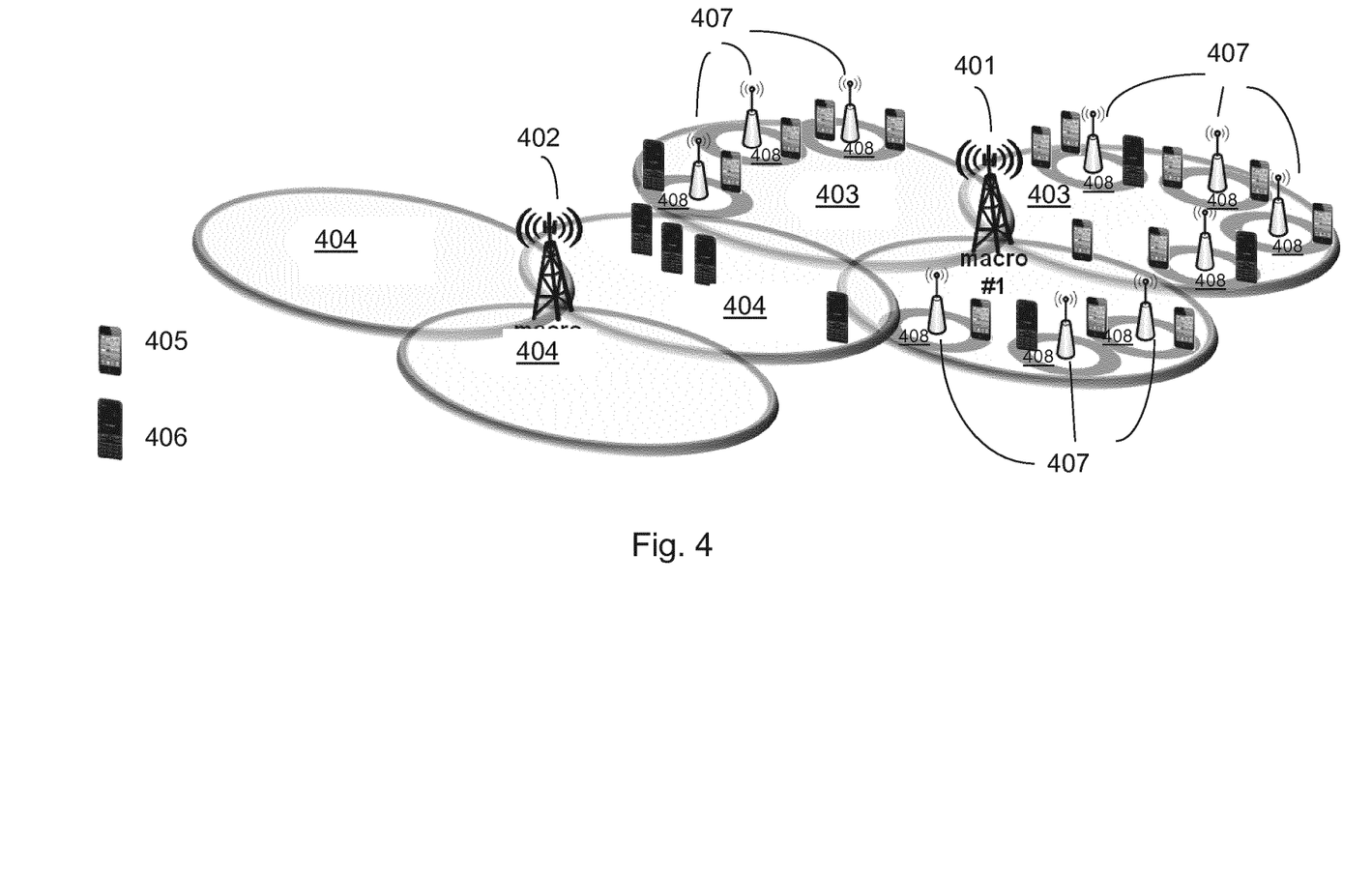
FIG. 4 shows a schematic diagram of a network according to some embodiments.

FIG. 4 illustrates the above. FIG. 4 depicts a first Macro-eNB 401 for providing communications for devices (UEs and/or network entities) in cells 403 (service areas) and a second Macro-eNB 402 for providing communications for devices in cells 404. Within cells 403 are a plurality of UEs 405, 406 and a plurality of small-eNBs 407 providing a smaller coverage area than the first Macro-eNB 401. The plurality of UEs 405, 406 comprise both non-legacy UEs 405 and legacy UEs 406. Coverage areas 408, each associated a respective one of the plurality of small-eNBs 407, provide a smaller coverage area than cells 403 provided by the first Macro-eNB. The plurality of small-eNBs 407 each provide for communications for UEs in respective coverage areas 408. Small-eNBs 407 may each be, for example, a network node such as a micro-eNB, a pico-eNB or a HeNB. Within cells 404 of the second Macro-eNB 402 are a plurality of legacy UEs 406 but no small-eNBs 407.

In operation, Macro-eNB 401 applies TDM eICIC by transmitting a pattern of ABSs and non-ABSs. Non-legacy UEs 405 may be successfully instructed to provide feedback on only one of these subframe types. Non-legacy UEs 405 may be configured to generate separate reports for providing feedback on ABSs and non-ABSs respectively. In other words, non-legacy UEs may be configured to generate a first type of report relating to ABS feedback but not to non-ABS feedback; and a second type of report relating to non-ABS feedback but not to ABS feedback. Legacy UEs 406 are not configured to distinguish between ABS and non-ABS and so are not configured to provide feedback on a particular subframe type. A UE may report a Channel State Information (CSI), which comprises, amongst other information, a Channel Quality Indicator (CQI) value indicating the quality of the communication link in a particular subframe. The CQI value may be determined by a UE. According to 3GPP for LTE, a CQI value reported by a UE in subframe x refers to n subframes in the past, i.e. the UE determines and/or measures the CQI in subframe number x-n. Depending on the transmitted pattern of ABSs and non-ABSs, subframe x-n and subframe x will not necessarily both correspond to an ABS (or, similarly, non-ABS) of Macro-eNB 401. The CQI values reported by legacy UE 406 may thus be mismatched such that Macro-ENB 402 and small-eNBs 407 could use CQI values calculated during ABS for assigning communication link parameters during non-ABS. In addition, 3GPP LTE releases do not currently define whether the CQI value measured at subframe x-n refers to the instantaneous channel quality of this specific subframe or whether it is averaged out over a certain number of subframes. Although averaging errors may be smoothed out using outer loop link adaptation (OLLA) mechanisms, the CQI with respect to ABSs and non-ABSs will still be incorrect and will result in the selection of an incorrect modulation and/or coding scheme compared to the real communication conditions the legacy UE 406 is experiencing. In contrast, non-legacy UEs 405 may be configured to determine a CQI using measurements from only ABSs and/or using measurements that were derived separately from ABSs and non-ABSs.

Macro-ENB 402 does not apply TDM eICIC and so does not apply any ABSs. Thus the problems experienced with respect to legacy UEs 406 in the cells 403 of Macro-eNB 401 do not apply in the cells 404 of Macro-eNB 402.

It is noted that the above discussed issues are not limited to any particular communication environment, but may occur in any appropriate communication system in which different types of subframes transmitted by a first device have respective interference characteristics on communications conducted between two other devices.

We further note that although the above problems are described in relation to time division multiplexing methods, similar problems can exist in the frequency domain using frequency division multiplexing methods. For example, in LTE for 3GPP, subchannels can be associated into respective groups to form respective Physical Resource Blocks (PRBs). A PRB may be muted by transmitting less information and/or transmitting using a lower power than when transmitting regular PRBs i.e. data PRBs. Similar to the subframe example described above, if a UE is not configured to distinguish between regular data PRBs and muted PRBs when determining feedback, feedback may be provided that relates to a mixture of regular data PRBs and muted PRBs. This makes it more difficult to optimise communication link parameters using the provided feedback than if the UE were configured to distinguish between regular data PRBs and muted PRBs.

Embodiments of the invention aim to address one or several of the above issues.

The invention is defined by the appended independent claims. Certain more specific aspects of the invention are defined by the dependent claims.

In accordance with an embodiment there is provided a method comprising: receiving feedback relating to a transmission slot; and subsequently determining the type of transmission slot the feedback relates to.

The determining step may comprise using a record linking transmission slot type to transmission time.

The method may further comprise: stamping the feedback so as to indicate the determined transmission slot type; and storing the feedback with the stamp.

The method may further comprise: storing the feedback in dependence on result of the determining step, wherein feedback relating to a first transmission slot type is stored separately to feedback relating to a second transmission slot type.

The method may further comprise: determining which type of transmission slot will be used at a particular time; determining at least one communication link parameter in dependence on the type of transmission slot to be used at the particular time and received feedback that has been determined to relate to that transmission slot type; and using the determined communication link parameters at the particular time. Preferably the at least one communication link parameter is at least one of: a modulation type; a coding scheme; and a Multiple-Input-Multiple-Output Mode.

Determining the transmission slot type may comprise determining whether the feedback relates to either a regular data transmission slot or a muted data transmission slot.

Determining the transmission slot type may comprise determining at least one of: whether the transmission slot is associated with an Almost Blank Subframe or a non-Almost Blank Subframe; and whether the transmission slot is associated with a muted Physical Resource Block or a regular Physical Resource Block.

The feedback may indicate a channel quality of a particular communication channel during the transmission slot relative to a predetermined scale or forms part of a Hybrid Automatic Repeat Request mechanism. Preferably the feedback forms part of a Hybrid Automatic Request mechanism and the method further comprises: correcting a previously stored indication of channel quality in dependence on the feedback; and using the corrected indication to determine communication link parameters to be used at a particular time.

Determining the transmission slot type may comprise at least one of: determining that the feedback was provided by user equipment that is not configured to distinguish between subframe type when determining feedback; and determining that the feedback was provided by user equipment that is not configured to distinguish between physical resource blocks when determining feedback.

The feedback may relate to transmissions made over one of: a data channel; or a control channel.

There is provided an apparatus comprising: at least one processor; and at least one memory including computer program code, wherein the at least one memory and the computer program code are configured to, with the at least one processor, cause the apparatus to perform at least the following: receive feedback from a device; and subsequently determine the type of transmission slot the feedback relates to.

The apparatus may determine the type of transmission slot using a record linking transmission slot type to transmission time.

The at least one memory and the computer program code may be further configured to, with the at least one processor, cause the apparatus to: stamp the feedback so as to indicate the determined transmission slot type; and store the feedback with the stamp.

The at least one memory and the computer program code may be further configured to, with the at least one processor, cause the apparatus to: store the feedback in dependence on result of the determining step, wherein feedback relating to a first transmission slot type is stored separately to feedback relating to a second transmission slot type.

The at least one memory and the computer program code may be further configured to, with the at least one processor, cause the apparatus to: determine which type of transmission slot will be used at a particular time; determine at least one communication link parameter in dependence on the type of transmission slot to be used at the particular time and received feedback that has been determined to relate to that transmission slot type; and use the determined communication link parameters at the particular time.

The at least one communication link parameter may be at least one of: a modulation type; a coding scheme; and a Multiple-Input-Multiple-Output Mode.

The apparatus may determine the transmission slot type by determining whether the feedback relates to either a regular data transmission slot or a muted data transmission slot.

The feedback may indicate a channel quality of a particular communication channel during the transmission slot relative to a predetermined scale or forms part of a Hybrid Automatic Repeat Request mechanism.

The feedback may form part of a Hybrid Automatic Request mechanism and the at least one memory and the computer program code are further configured to, with the at least one processor, cause the apparatus to: correct a previously stored indication of channel quality in dependence on the feedback; and use the corrected indication to determine communication link parameters to be used at a particular time.

The apparatus may determine the transmission slot type in dependence on at least one of: a determination that the feedback was provided by user equipment that is not configured to distinguish between transmission slot type when determining feedback; and determining that the feedback was provided by user equipment that is not configured to distinguish between physical resource blocks when determining feedback.

The feedback may relate to transmissions made over one of: a data channel; or a control channel.

Determining the transmission slot type may comprise determining at least one of: whether the transmission slot is associated with an Almost Blank Subframe or a non-Almost Blank Subframe; and whether the transmission slot is associated with a muted Physical Resource Block or a regular Physical Resource Block.

There is also provided an apparatus comprising means for receiving feedback relating to a transmission slot; and means for subsequently determining the type of transmission slot the feedback relates to.

The determining step may comprise using a record linking transmission slot type to transmission time.

The apparatus may further comprise: means for stamping the feedback so as to indicate the determined transmission slot type; and means for storing the feedback with the stamp.

The apparatus may further comprise: means for storing the feedback in dependence on result of the determining step, wherein feedback relating to a first transmission slot type is stored separately to feedback relating to a second transmission slot type.

The apparatus may further comprise: means for determining which type of transmission slot will be used at a particular time; means for determining at least one communication link parameter in dependence on the type of transmission slot to be used at the particular time and received feedback that has been determined to relate to that transmission slot type; and means for using the determined communication link parameters at the particular time. Preferably the at least one communication link parameter is at least one of: a modulation type; a coding scheme; and a Multiple-Input-Multiple-Output Mode.

Determining the transmission slot type may comprise determining whether the feedback relates to either a regular data transmission slot or a muted data transmission slot.

Determining the transmission slot type may comprise determining at least one of: whether the transmission slot is associated with an Almost Blank Subframe or a non-Almost Blank Subframe; and whether the transmission slot is associated with a muted Physical Resource Block or a regular Physical Resource Block.

The feedback may indicate a channel quality of a particular communication channel during the transmission slot relative to a predetermined scale or forms part of a Hybrid Automatic Repeat Request mechanism. Preferably the feedback forms part of a Hybrid Automatic Request mechanism and the method further comprises: correcting a previously stored indication of channel quality in dependence on the feedback; and using the corrected indication to determine communication link parameters to be used at a particular time.

Determining the transmission slot type may comprise at least one of: determining that the feedback was provided by user equipment that is not configured to distinguish between subframe type when determining feedback; and determining that the feedback was provided by user equipment that is not configured to distinguish between physical resource blocks when determining feedback.

The feedback may relate to transmissions made over one of: a data channel; or a control channel.

A computer program comprising program code means adapted to perform the method may also be provided.

Various other aspects and further embodiments are also described in the following detailed description and in the attached claims.

The invention will now be described in further detail, by way of example only, with reference to the following examples and accompanying drawings, in which.

In the following certain exemplifying embodiments are explained with reference to a wireless or mobile communication system serving mobile communication devices. Before explaining in detail the exemplifying embodiments, certain general principles of a wireless communication system and mobile communication devices are briefly explained with reference to FIGS. 1 to 3 to assist in understanding the technology underlying the described examples.

In a wireless communication system mobile communication devices or user equipments (UE) 102, 103 are provided wireless access via at least one base station or similar wireless transmitting and/or receiving node or point. In the FIG. 1 example two overlapping access systems or radio service areas of a cellular system 100 and 110 and two smaller radio service areas 119, 117 provided by base stations 106, 107, 118 and 120 are shown. Each mobile communication device and station may have one or more radio channels open at the same time and may send signals to and/or receive signals from more than one source. It is noted that the radio service area borders or edges are schematically shown for illustration purposes only in FIG. 1. It shall also be understood that the sizes and shapes of radio service areas may vary considerably from the shapes of FIG. 1. A base station site can provide one or more cells. A base station can also provide a plurality of sectors, for example three radio sectors, each sector providing a cell or a subarea of a cell. All sectors within a cell can be served by the same base station.

Figure 1:
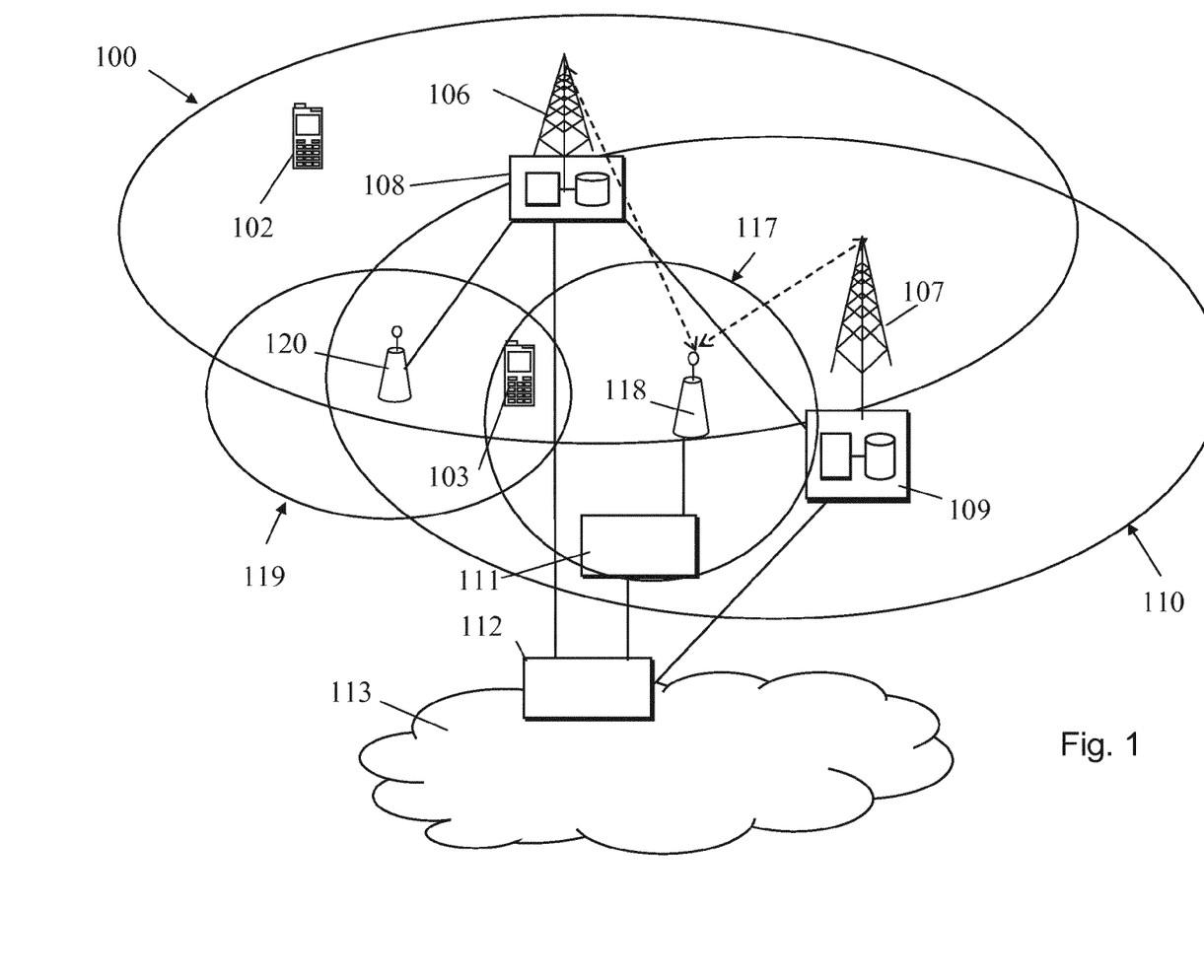
FIG. 1 shows a schematic diagram of a network according to some embodiments.

Base stations are typically controlled by at least one appropriate controller apparatus so as to enable operation thereof and management of mobile communication devices in communication with the base stations. In FIG. 1 control apparatus 108 and 109 are shown for controlling respective macro level base stations 106 and 107. The control apparatus of a base station can be interconnected with other control entities. The control apparatus is typically provided with memory capacity and at least one data processor. The control apparatus and functions may be distributed between a plurality of control units.

In FIG. 1 stations 106 and 107 are shown as connected to a wider communications network 113 via gateway 112. A further gateway function may be provided to connect to another network. The smaller stations 118 and 120 can also be connected to the network 113, for example by a separate gateway function and/or via the controllers of the macro level stations. In the example, station 118 is connected via a gateway 111 whilst station 120 connects via the controller apparatus 108.

A non-limiting example of the recent developments in communication system architectures is the long-term evolution (LTE) of the Universal Mobile Telecommunications System (UMTS) that is being standardized by the 3rd Generation Partnership Project (3GPP). As explained above, further development of the LTE is referred to as LTE-Advanced. Non-limiting examples of appropriate LTE access nodes are a macro base station, for example what is known as eNodeB (eNB) in the vocabulary of the 3GPP specifications, Home eNBs (HeNB), pico eNodeBs (pico-eNB), femto nodes, and radio remote heads (RRH) connected to an eNB. The LTE employs a mobile architecture known as the Evolved Universal Terrestrial Radio Access Network (E-UTRAN). Base stations of such systems are known as evolved or enhanced Node Bs (eNBs) and may provide E-UTRAN features such as user plane Radio Link Control/Medium Access Control/Physical layer protocol (RLC/MAC/PHY) and control plane Radio Resource Control (RRC) protocol terminations towards the user devices. Other examples of radio access system include those provided by base stations of systems that are based on technologies such as wireless local area network (WLAN) and/or WiMax (Worldwide Interoperability for Microwave Access).

Figure 2:
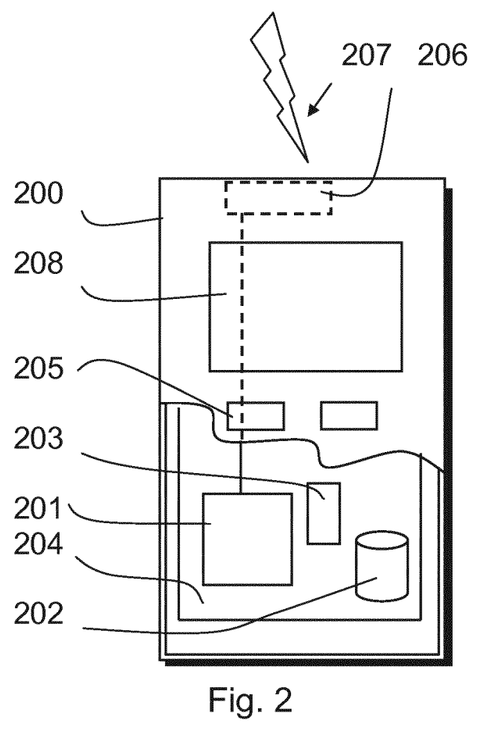
FIG. 2 shows a schematic diagram of a mobile communication device according to some embodiments.

A possible mobile communication device for transmitting and retransmitting information blocks towards the stations of the system will now be described in more detail in reference to FIG. 2 showing a schematic, partially sectioned view of a communication device 200. Such a communication device is often referred to as user equipment (UE) or terminal. An appropriate mobile communication device may be provided by any device capable of sending and receiving radio signals. Non-limiting examples include a mobile station (MS) such as a mobile phone or what is known as a 'smart phone', a portable computer provided with a wireless interface card or other wireless interface facility, personal data assistant (PDA) provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services include two-way or multi-way calls, data communication or multimedia services or simply an access to a data communications network system, such as the Internet. User may also be provided broadcast or multicast data. Non-limiting examples of the content include downloads, television and radio programs, videos, advertisements, various alerts and other information. The mobile device may receive signals over an air interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

A mobile device is also typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chip-sets. This feature is denoted by reference 204.

The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

Figure 3:
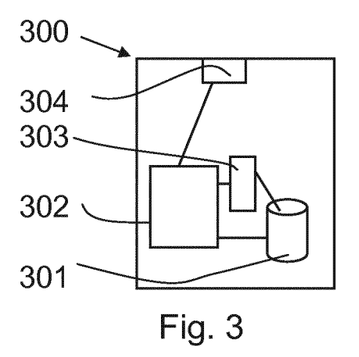
FIG. 3 shows a schematic diagram of a control apparatus according to some embodiments.

FIG. 3 shows an example of a control apparatus for a communication system, for example to be coupled to and/or for controlling a station of an access system. In some embodiments base stations comprise a separate control apparatus. In other embodiments the control apparatus can be another network element. The control apparatus 300 can be arranged to provide control on communications in the service area of the system. The control apparatus 300 can be configured to provide control functions in association with retransmission and muting by means of the data processing facility in accordance with certain embodiments described below. For this purpose the control apparatus comprises at least one memory 301, at least one data processing unit 302, 303 and an input/output interface 304. Via the interface the control apparatus can be coupled to a receiver and a transmitter of the base station. The control apparatus can be configured to execute an appropriate software code to provide the control functions. It shall be appreciated that similar component can be provided in a control apparatus provided elsewhere in the system for controlling reception of sufficient information for decoding of received information blocks.

Communication devices can access the communication system based on various access techniques, such as code division multiple access (CDMA), or wideband CDMA (WCDMA). Other examples include time division multiple access (TDMA), frequency division multiple access (FDMA) and various schemes thereof such as the interleaved frequency division multiple access (IFDMA), single carrier frequency division multiple access (SC-FDMA) and orthogonal frequency division multiple access (OFDMA), space division multiple access (SDMA) and so on.

A wireless device can be provided with a Multiple Input/Multiple Output (MIMO) antenna system. MIMO arrangements as such are known. MIMO systems use multiple antennas at the transmitter and receiver along with advanced digital signal processing to improve link quality and capacity. Although not shown in FIGS. 1 and 2, multiple antennas can be provided at the relevant nodes, for example at base stations and mobile stations, and the transceiver apparatus 206 of FIG. 2 can provide a plurality of antenna ports. More data can be received and/or sent where there are more antennae elements.

The present invention relates to determining a transmission slot type. In particular, the following relates to determining whether a muted transmission was made in a transmission slot. A muted transmission is a transmission made at a lower power and/or that comprises less information than a regular data transmission. Throughout the following, exemplary methods will be presented that detail actions that can be performed by communication devices in a network. For simplicity, the following will recite the method steps as being performed by a network device, such as a macro-eNB or a small-eNB. In particular, the following recites that the network device is configured to determine the transmission slot type. However, it is understood that other communication devices may be configured to execute the mentioned steps. Similarly, the feedback will be described as being provided by a user equipment (UE). The actual feedback may be provided by other communication devices and the described methods are not limited to the provision of feedback solely from a UE. A network device that determines the type of transmission slot to which a received feedback relates may receive that feedback from a range of different communication devices, either directly or indirectly. Further, the following mentions ABSs and non-ABSs as types of subframe the network device is configured to distinguish between. These are possible subframe types. The following methods may be extended to distinguish between other subframe types. In particular, the following methods may be beneficial in instances in which different subframes transmitted by a network node have differing interference characteristics on communications conducted between other devices. Certain embodiments in the following adopt language employed in Releases of the 3GPP for LTE specification. Such embodiments are not limited to the specifics detailed therein. Further, the following embodiments disclose receiving feedback relating to a particular subframe type i.e. ABS or non-ABS. However, the same principles may be extended to the frequency domain by receiving feedback relating to a particular PRB type i.e. a muted PRB or a regular PRB. The same principles may be further extended such that transmission slot types are determined according to the power at which they were transmitted.

Throughout the following, the term "feedback" preferably indicates information indicative of the quality of a communication link between two devices. Preferably, the communication link is used to communicate information between UE and a network device.

Figure 5:
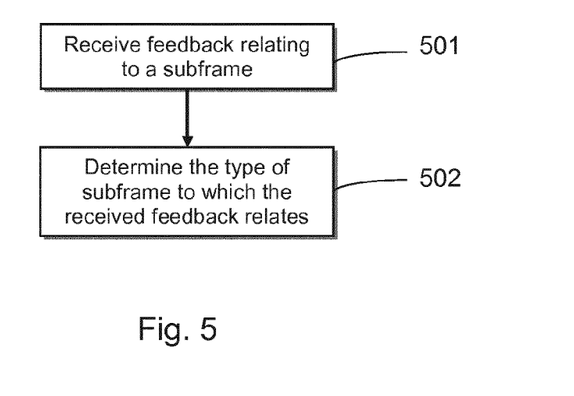
FIGS. 5 to 9 show flow charts to be employed by communication devices according to embodiments described below.

FIG. 5 is a flowchart illustrating a method that is implemented by a network device. According to this method, the network device receives feedback relating to a transmission slot (501). The feedback may relate to that transmission slot because it was measured and/or determined by UE during that transmission slot. Subsequently, the network device determines the type of transmission slot to which the received feedback relates (502). When implemented in a 3GPP for LTE system by a network device, such as a Macro-eNB, or a small-eNB, the network device may determine whether the feedback was provided by UE that is configured to distinguish between transmission slot types prior to determining the type of transmission slot to which the received feedback relates (502). For example, the UE may be configured to distinguish between transmission slot types as the UE is configured to distinguish between ABSs and non-ABSs. Alternatively or in addition, the UE may be configured to distinguish between transmission slot types as the UE is configured to distinguish between muted PRBs and regular PRBs. As mentioned above, a muted PRB is a PRB on which less information is transmitted or a lower power is used to transmit compared to a regular PRB. The network device may be configured to determine whether the received feedback was provided by UE that is configured to distinguish between transmission slot types by determining whether the received feedback was measured and/or determined at a legacy UE. In a 3GPP for LTE system, this may be performed by evaluating an "access stratum release indicator" (ASRI) transmitted by the UE. The ASRI indicates a 3GPP Release according to which the UE may operate. For example, the ASRI may indicate that the UE operates in accordance with Release 8 of the 3GPP for LTE specification. The access stratum release indicator is commonly transmitted during connection procedures. Legacy UEs are ABS-agnostic and so are not configured to detect a difference between ABS and non-ABS subframes. Legacy UEs may be considered to be those UEs that operate in accordance with any of Releases 8 and 9 of the 3GPP for LTE specification. A non-legacy UE may not be configured to distinguish between transmission slot types at the time at which the feedback is measured or determined. In such a case, the network device may determine the transmission slot type to which the feedback relates. The network device may keep a record of a 3GPP for LTE Release according to which each UE is currently operating. The network device may keep a record of the current configuration of each UE. This latter record may be used to determine whether or not a UE is currently configured to distinguish between ABSs and non-ABSs and/or whether a UE is currently configured to distinguish between muted PRBs and regular PRBs.

Figure 6:
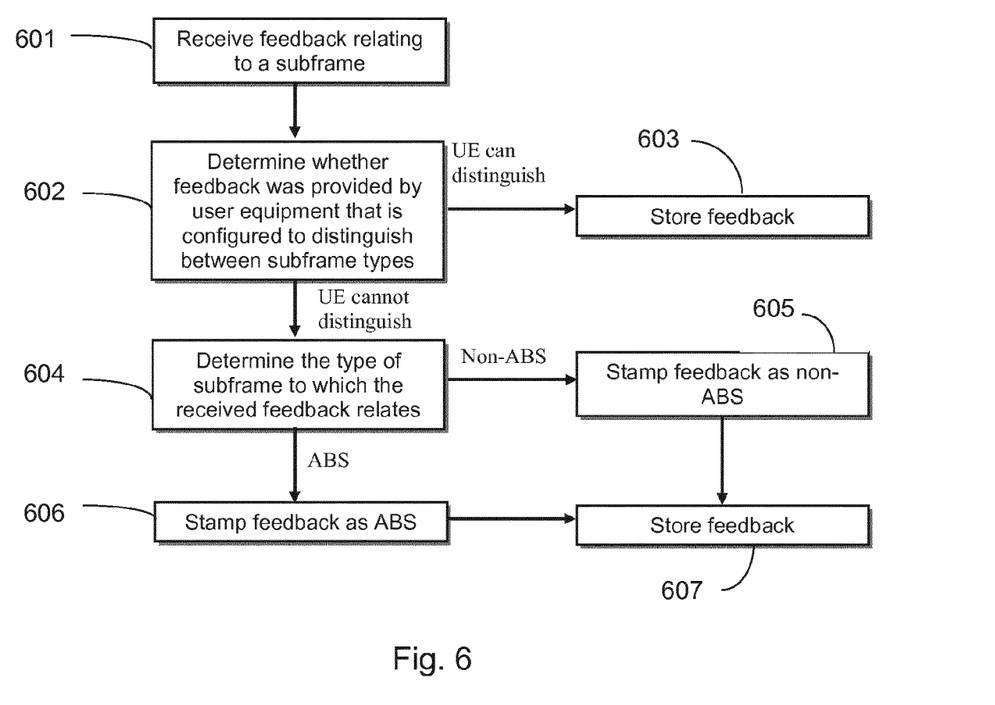

A flowchart illustrating a method in which a network device determines whether the received feedback was provided by a legacy UE is shown in FIG. 6. The embodiment of FIG. 6 discloses receiving feedback relating to a particular subframe type i.e. ABS or non-ABS. However, the same principles may be extended to the frequency domain by receiving feedback relating to a particular PRB type i.e. a muted PRB or a regular PRB. At step 601, the network device receives feedback relating to a subframe. The feedback may relate to that subframe because it was measured and/or determined by another communication device (e.g. by UE) during that subframe. The network device determines whether the received feedback was provided by a UE that is configured to distinguish between subframe types (602). Determining step 602 may comprise determining the specification according to which the UE was operating at the time at which the feedback was measured and/or determined by the UE. This may comprise determining the identity of the user equipment providing the feedback and looking up in memory whether that device is presently configured to distinguish between subframe types. The specification may be determined by means of a bit in the received feedback signal indicating whether or not the UE providing the feedback is a legacy UE.

If the network device determines that the UE was configured to distinguish between subframe types at the time the feedback was measured and/or determined, the network device stores the received feedback signal 603. If the network device determines that the UE cannot distinguish between subframe type, the network device subsequently determines the type of subframe to which the received feedback relates (604). In the present embodiment, the network device is configured to determine whether the received feedback relates to an ABS or a non-ABS. The network device may maintain a record of previously transmitted ABSs and non-ABSs or may have access to a record of such. This record is preferably in the form of a bit-map. The network device may determine whether the received feedback relates to an ABS or a non-ABS by determining the time at which the feedback was measured and/or determined by the UE and accessing the bitmap in dependence on the determined time. The time may be determined using slot numbers associated with the current subframe and the subframe in which the feedback was measured and/or determined by the UE.

If the network device determines that the feedback relates to a non-ABS, the network device stamps the feedback as non-ABS (605) before storing the feedback and the stamp in a memory (607). If the network device determines that the feedback relates to an ABS, the network device stamps the feedback as ABS (606) before storing the feedback and the stamp in a memory (607).

Preferably, the feedback is a CSI. A CSI provides an indication of the channel quality and comprises at least one of: a CQI; a rank indicator (RI); and a precoding matrix indicator (PMI). A CQI is a value between 0 and 15 that provides a relative scale on which to indicate the quality of a channel. An RI provides an indication of the number of useful transmission layers. A PMI is a value that corresponds to a codebook index, defined in Release 10 of 3GPP for LTE, which corresponds to a codebook used for precoding. Alternatively, the feedback may form part of a HARQ mechanism. For example, the feedback may be an ACK, a NACK and/or a bitmap comprising a plurality of ACKs and NACK and/or some other means for providing an indication of the reception of a previously transmitted subframe. If the feedback forms part of a HARQ mechanism, the network device may be arranged to execute the method illustrated by the flowchart of FIG. 7. The embodiment of FIG. 7 discloses receiving feedback relating to a particular subframe type i.e. ABS or non-ABS. However, the same principles may be extended to the frequency domain by receiving feedback relating to a particular PRB type i.e. a muted PRB or a regular PRB.

Figure 7:
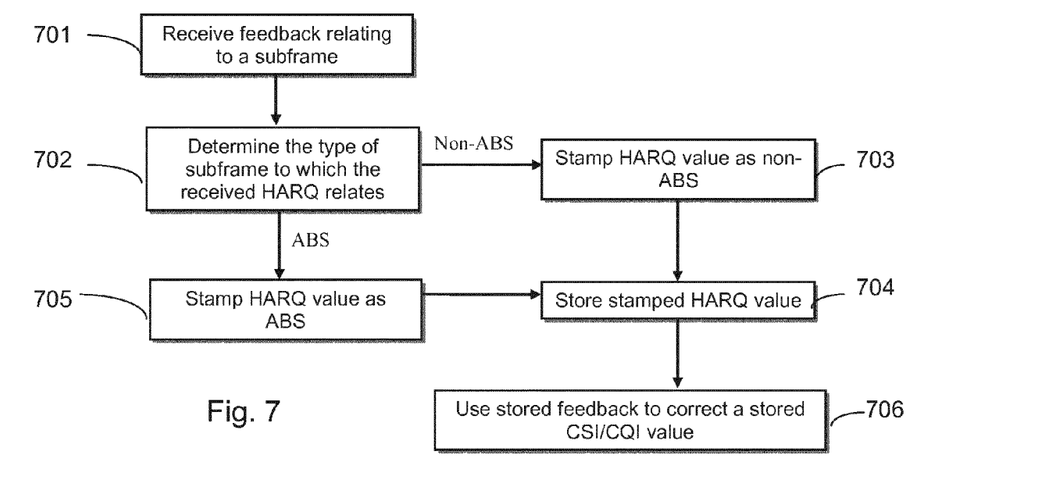

In step 701, the network device receives HARQ feedback relating to a subframe. The network device subsequently determines the type of subframe to which the received HARQ feedback relates (702). In the present embodiment, the network device is configured to determine whether the subframe relates to an ABS or a non-ABS. If the network device determines that the subframe to which the feedback relates is a non-ABS, the network device stamps the feedback as non-ABS (703) before storing the received HARQ feedback and the stamp in a memory (704). If the network device determines that the subframe to which the feedback relates is an ABS, the network device stamps the feedback as ABS (705) before storing the received HARQ feedback and the stamp in a memory (704). The feedback determined to relate to ABS is preferably stored separately to the feedback determined to relate to non-ABS. In the present context, the term separate is intended to indicate a logical separation as opposed to a physical separation. However, the different types of feedback (i.e. those relating to ABS and those relating to non-ABS) may be stored separately in physically distinct memories.

The network device comprises a stored CQI value relating to each subframe type. In other words, the network device comprises access to a stored CQI value relating to ABSs and access to a stored CQI value relating to non-ABSs. The CQI value may be stored separately from other information comprised within the CSI or may be stored as part of the CSI. The network device is configured to use the received HARQ feedback to correct the stored CQI value (706). The network device is configured to perform this correction in dependence on the determined subframe type i.e. ABS or non-ABS. The network device is preferably configured to only correct the stored CQI value associated with ABS using HARQ feedback that is determined to relate to an ABS. The network device is preferably configured to only correct the stored CQI value associated with non-ABS using HARQ feedback that is determined to relate to a non-ABS.

Once a CQI value has been obtained for at least one of an ABS or a non-ABS (either directly from the feedback or indirectly from the feedback e.g. via the HARQ mechanism), the network device may use this value to calculate at least one communication parameter of a communication link. In particular, the network device may use a CQI value associated with a particular subframe type to determine at least one communication parameter, such as the modulation and/or coding scheme, to be used when that subframe type is in use in the future. For example, the network device may be configured to use a CQI value associated with an ABS to determine what type of modulation and/or coding scheme to use during future ABSs. Likewise, the network device may be configured to use a CQI value associated with a non-ABS to determine what type of modulation and/or coding scheme to use during future non-ABSs.

Figure 8:
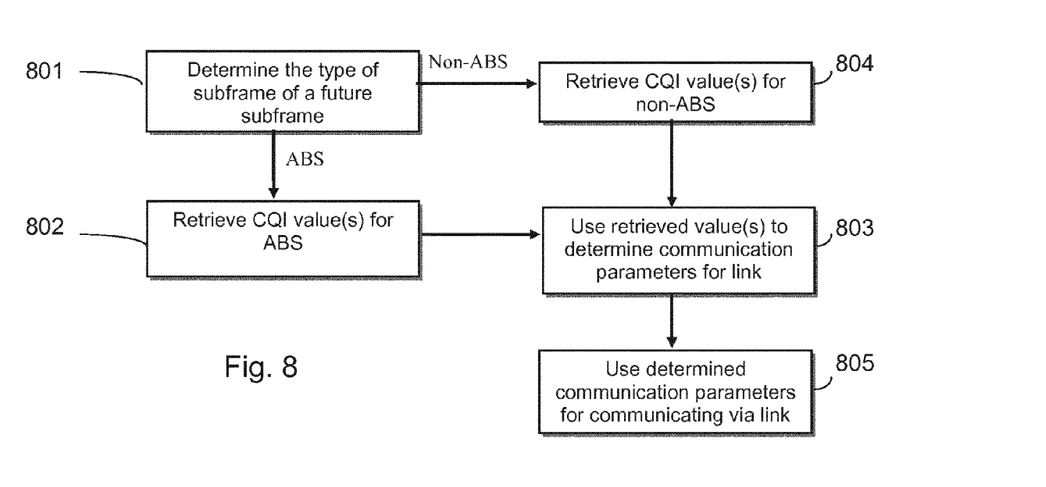

An example of how a network device may use the stored CQI values is illustrated in FIG. 8. The embodiment of FIG. 8 discloses receiving feedback relating to a particular subframe type i.e. ABS or non-ABS. However, the same principles may be extended to the frequency domain by receiving feedback relating to a particular PRB type i.e. a muted PRB or a regular PRB. In 801, the network device is configured to determine the type of subframe that will be used at a particular time (801). A particular instant in time will have an associated subframe. Preferably, the network device is configured to determine whether, at time t, the network device will employ an ABS or a non-ABS. If the network device determines that it will communicate using an ABS at time t, the network device is configured to retrieve at least one stored CQI value for ABS (802) and to use the retrieved value(s) to determine communication link parameters for the link at time t (803). At least one communication link parameter may be a modulation scheme. At least one communication link parameter may be a coding scheme. If the network device determines that it intends to employ a non-ABS at time t, the network device is configured to retrieve at least one stored CQI value for non-ABS (804) and to use the retrieved value(s) to determine communication link parameters for the link at time t (803). At least one communication link parameter may be a modulation scheme. At least one communication link parameter may be a modulation scheme. Having determined the at least one communication parameters for the communication link at time t, the network device is configured to use those determined communication link parameters at time t for communicating via link (805). The network device is configured to communicate with another network device at time t using the at least one determined communication link parameter.

The network device is configured to transmit the determined communication link parameter(s) to the other network device in advance of time t.

As mentioned above, HARQ feedback is used to determine Block-Error-Rates (BLERs). BLERs are, in turn, used as a link quality measure by a network node for Multiple-Input-Multiple-Output (MIMO) mode control and link adaptation. An example of a downlink link to which such link adaptation may be applied is a downlink control channel, such as the Physical Downlink Control Channel (PDCCH) in 3GPP for LTE. Another example of a downlink link to which such link adaptation may be applied is a downlink data channel, such as the Physical Downlink Shared Channel (PDSCH) in 3GPP for LTE. The above described methods may be applied to received HARQ feedback for this purpose. In other words, the network device may use the stored, stamped HARQ values from step 704 to determine communication parameters for a communication link. In particular, the network device may retrieve the stored, stamped HARQ values for MIMO mode control. The network device may retrieve the stored, stamped HARQ values for uplink link adaptation. To use the stored, stamped HARQ values as such, the network device would proceed substantially as described in relation to FIG. 8, bar in step 802 the network device would retrieve stored HARQ value(s) for ABSs and in step 804 the network device would retrieve stored HARQ value(s) for non-ABSs. In step 803, the retrieved value(s) would be used to determine communication parameters for the communication link. For example, the retrieved values could be used for MIMO mode control or uplink link adaptation. The network device may then configure the UE to use the determined communication parameters for communicating via the communication link.

Figure 9:
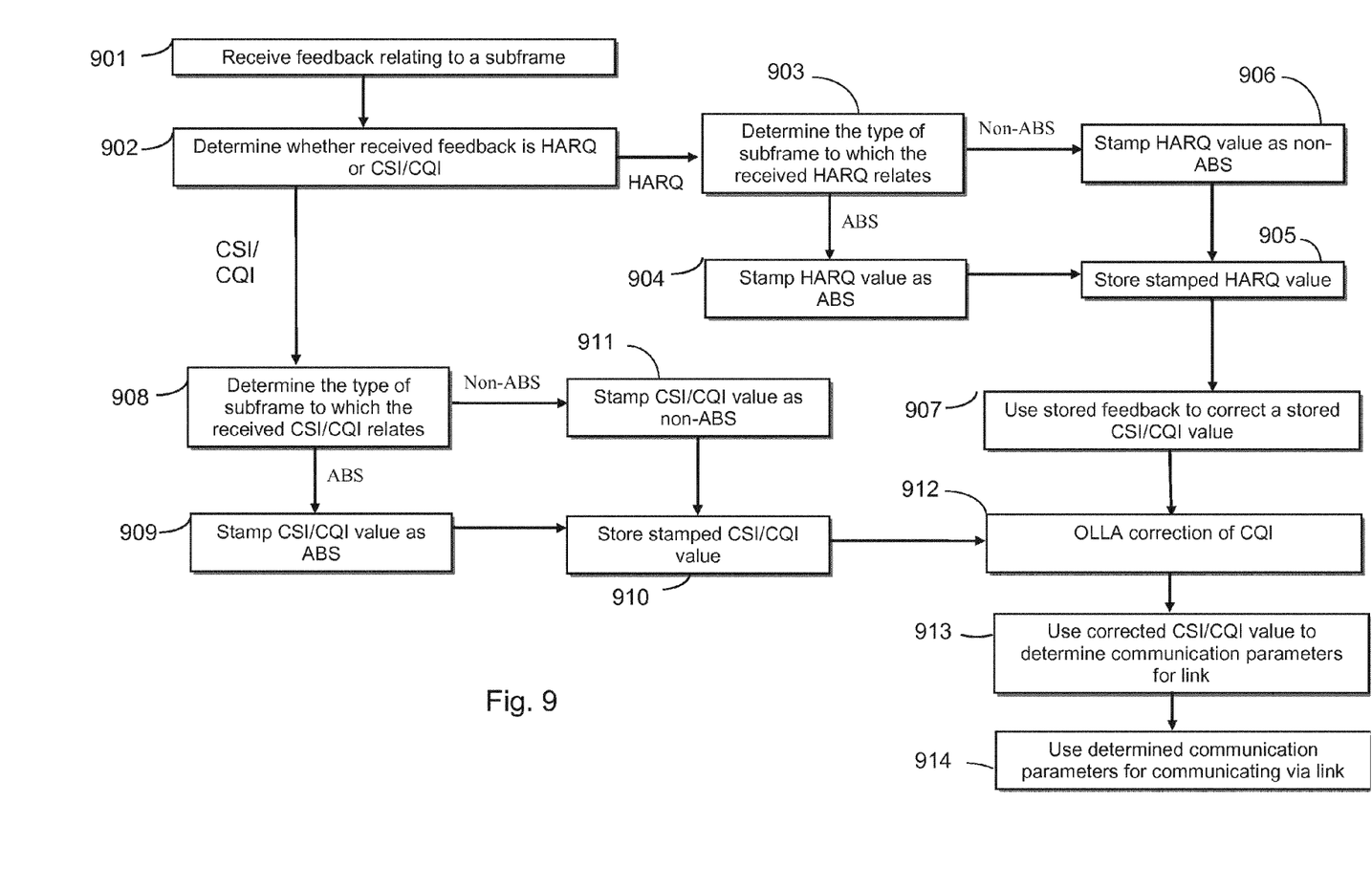

A possible embodiment combining various elements of the above described systems is provided in FIG. 9. The embodiment of FIG. 9 discloses receiving feedback relating to a particular subframe type i.e. ABS or non-ABS. However, the same principles may be extended to the frequency domain by receiving feedback relating to a particular PRB type i.e. a muted PRB or a regular PRB. The network device is arranged to receive feedback relating to a subframe (901). Although not depicted in FIG. 9, at this point, the network device is optionally configured to determine whether the received feedback is provided by a UE that was configured to distinguish between ABSs and non-ABSs at the time the feedback was measured and/or determined by the UE. If this optional step is included, the network device may be configured to only proceed to step 902 if it is determined that the UE was not configured to distinguish between ABSs and non-ABSs at that time. In step 902, the network device is configured to determine whether the received feedback is provided by means of a HARQ mechanism or whether it is a CSI comprising a CQI. If the network device determines that the received feedback is provided by means of a HARQ mechanism, the network device determines the type of subframe to which the HARQ feedback relates (903). In other words, the network device determines whether the received feedback relates to an ABS or non-ABS. If the network device determines that the feedback relates to an ABS, the HARQ feedback is stamped as ABS (904) before being stored, with the stamp in memory (905). If the network device determines that the feedback relates to a non-ABS, the HARQ feedback is stamped as non-ABS (906) before being stored, with the stamp in memory (905). In both cases, the stored HARQ value is used to correct a corresponding stored CQI value (907). The network device is configured to perform this correction in dependence on the determined subframe type i.e. ABS or non-ABS. The network device is preferably configured to only correct the stored CQI value associated with ABS using HARQ feedback that is determined to relate to an ABS. Similarly, the network device is preferably configured to only correct the stored CQI value associated with non-ABS using HARQ feedback that is determined to relate to a non-ABS.

At step 902, the network device may determine that the received feedback is a CSI comprising a CQI. In this case, the network device is configured to proceed to step 908. In step 908, the network device determines the type of subframe to which the received CQI value relates. In other words, the network device determines whether the CQI value was measured and/or calculated during an ABS or a non-ABS. If it is determined that the CQI value relates to an ABS, the CQI value is stamped to indicate ABS (909) and subsequently stored in a memory with the stamp (910). If it is determined that the CQI value relates to a non-ABS, the CQI value is stamped to indicate non-ABS (911) and subsequently stored in a memory with the stamp (910). The CQI value may be stamped and subsequently stored in a memory either as part of the CSI or separately from other information comprised within the CSI. In this way, correcting the CQI may also be described as correcting the CSI.

Once at least one CQI value has been obtained for a particular subframe type e.g. ABS or non-ABS (either directly from the feedback, e.g. via a CSI, or indirectly from the feedback, e.g. via the HARQ mechanism), the network device may use this value to modify (and set) at least one communication parameter of a communication link. In particular, the network device may use a CQI value associated with a particular subframe type to determine at least one communication parameter, such as the modulation and/or coding scheme, to be used during future instances of using that type of subframe. For example, the network device may be configured to use a CQI value associated with an ABS to determine what type of modulation and/or coding scheme to use during future ABSs. Likewise, the network device may be configured to use a CSI value associated with a non-ABS to determine what type of modulation and/or coding scheme to use during future non-ABSs.

The CQI value may be configured to perform OLLA correction of the CQI following the storage steps 907, 910. This correction step is indicated at 912 in FIG. 9.

The network device is configured to use the corrected CQI values to determine communication link parameters for a communication link at time t (913). This may use the process the outlined above in relation to FIG. 8. For example, the network device is configured to determine the type of subframe that will be used at a particular time. A particular instant in time will have an associated subframe. Preferably, the network device is configured to determine whether, at time t, the network device intends to employ an ABS or a non-ABS. If the network device determines that it intends to communicate using an ABS at time t, the network device is configured to retrieve at least one stored CQI value for ABS and to use the retrieved value(s) to determine communication link parameters for the link at time t. At least one communication link parameter may be a modulation scheme. At least one communication link parameter may be a coding scheme. If the network device determines that it intends to employ a non-ABS at time t, the network device is configured to retrieve at least one stored CQI value for non-ABS and to use the retrieved value(s) to determine communication link parameters for the link at time t. At least one communication link parameter may be a modulation scheme. At least one communication link parameter may be a coding scheme. At least one communication link parameter may be a MIMO mode. Having determined the at least one communication parameters for the communication link at time t, the network device is configured to use those determined communication link parameters at time t for communicating via link (914). The network device is configured to communicate with another network device at time t. The network device is configured to transmit the determined communication link parameters to the other network device in advance of time t.

The stored feedback values may be used by the network device in a variety of ways. For example, the network device may be configured to use the feedback values in deriving OLLA corrections for the Physical Downlink Control Channel (PDCCH). The network device may be configured to use the feedback values in deriving OLLA corrections for the Physical Downlink Shared Channel (PDSCH). OLLA is applied in the network device for link adaptation and packet scheduling. OLLA adjusts the CQI based on the packet reception status. For example, the CQI could be increased if an acknowledgement is received and decreased if a negative acknowledgement is received. By modifying the CQI in this way, OLLA better aligns the received CQI with the actual channel conditions. The acknowledgements may be received as part of the above described HARQ mechanisms. As the above described embodiments result in a CQI value associated with ABSs ($CQI_{ABS}$) and a CQI value associated with non-ABSs ($CQI_{NON-ABS}$), the network device is preferably arranged to use one OLLA mechanism for ABSs (i.e. using only $CQI_{ABS}$ values) and a different OLLA mechanism for non-ABSs (i.e. using only $CQI_{NON-ABS}$ values).

Preferably, all of the processes described above in relation to FIGS. 5 to 9 are implemented in a multi-layer system, such as a Hetnet.

In all of the embodiments mentioned above in relation to FIGS. 1 to 9, the network device is preferably a device that is configured to determine and/or set communication parameters to be used on a communication link. To do this, the network device is configured to transmit reconfiguration instructions to UEs within its associated coverage area. The network device mentioned above in relation to FIGS. 1 to 9 is preferably a Macro-eNB. The network device mentioned above in relation to FIGS. 1 to 9 may be a small eNB.

In the embodiments described above, the network device is described as using the stored feedback values to determine communication parameters for a link. The CQI is also used to schedule downlink transmissions. Further, MIMO mode control decides and reports the MIMO mode to the downlink scheduler based on CQI and RI. Preferably, the CQI input to the MIMO mode control is selected such that downlink transmissions to be made using ABSs are controlled using a $CQI_{ABS}$ and downlink transmissions to be made using non-ABSs are controlled using $CQI_{NON-ABS}$.

The required data processing apparatus and functions of a control apparatus for the determinations at a communication device, a base station and any other node or element may be provided by means of one or more data processors. The described functions may be provided by separate processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non-limiting examples. The data processing may be distributed across several data processing modules. A data processor may be provided by means of, for example, at least one chip. Appropriate memory capacity can also be provided in the relevant devices. The memory or memories may be of any type suitable to the local technical environment and may be implemented using any suitable data storage technology, such as semiconductor based memory devices, magnetic memory devices and systems, optical memory devices and systems, fixed memory and removable memory.

An appropriately adapted computer program code product or products may be used for implementing the embodiments, when loaded or otherwise provided on an appropriate data processing apparatus, for example for causing determinations for adaptive assignment of retransmission transmission slot identities and for the related operations. The program code product for providing the operation may be stored on, provided and embodied by means of an appropriate carrier medium. An appropriate computer program can be embodied on a computer readable record medium. A possibility is to download the program code product via a data network. In general, the various embodiments may be implemented in hardware or special purpose circuits, software, logic or any combination thereof. Embodiments of the inventions may thus be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

It is noted that whilst embodiments have been described in relation to LTE-Advanced, similar principles can be applied to any other communication system where a carrier comprising a multiple of component carriers is employed. Therefore, although certain embodiments were described above by way of example with reference to certain exemplifying architectures for wireless networks, technologies and standards, embodiments may be applied to any other suitable forms of communication systems than those illustrated and described herein.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. For example, a combination of one or more of any of the other embodiments previously discussed can be provided. All such and similar modifications of the teachings of this invention will still fall within the scope of this invention as defined in the appended claims.

The invention claimed is:

1. A method comprising:
   receiving, at a base station and from user equipment, feedback relating to a transmission slot, wherein there are multiple types of transmission slots;
   subsequently determining by the base station a type of transmission slot to which the feedback relates;
   determining by the base station which type of transmission slot will be used at a particular time for communication with the user equipment;
   determining by the base station at least one communication link parameter in dependence on the type of transmission slot to be used at the particular time and the received feedback, which has been determined to relate to that type of transmission slot; and performing, by the base station and to the user equipment, a communication at the particular time, at least by using the determined at least one communication link parameter.

2. The method as claimed in claim 1, wherein the determining step comprises using a record linking a type of transmission slot to transmission time.

3. The method as claimed in claim 1, further comprising:
stamping the feedback so as to indicate the determined type of transmission type; and
storing the feedback with the stamp.

4. The method as claimed in claim 1, further comprising:
storing the feedback in dependence on result of the determining step, wherein feedback relating to a first type of transmission slot is stored separately to feedback relating to a second type of transmission slot.

5. The method as claimed in claim 1, wherein the at least one communication link parameter is at least one of: a modulation type; a coding scheme; and a Multiple-Input-Multiple-Output Mode.

6. A method as claimed in claim 1, wherein determining the type of transmission slot comprises determining whether the received feedback relates to either a regular data transmission slot or a muted data transmission slot.

7. The method as claimed in claim 1, wherein determining the type of transmission slot type-comprises determining at least one of: whether the transmission slot is associated with an Almost Blank Subframe or a non-Almost Blank Subframe; and whether the transmission slot is associated with a muted Physical Resource Block or a regular Physical Resource Block.

8. The method as claimed in claim 1, wherein the received feedback indicates a channel quality of a particular communication channel during the transmission slot relative to a predetermined scale or forms part of a Hybrid Automatic Repeat Request mechanism.

9. The method as claimed in claim 8, wherein the received feedback forms part of a Hybrid Automatic Request mechanism and the method further comprises:
correcting a previously stored indication of channel quality in dependence on the received feedback; and
using the corrected indication to determine communication link parameters to be used at the particular time.

10. The method as claimed in claim 1, wherein determining the type of transmission slot comprises at least one of: determining that the received feedback was provided by user equipment that is not configured to distinguish between subframe type when determining feedback; and determining that the received feedback was provided by user equipment that is not configured to distinguish between physical resource blocks when determining feedback.

11. The method as claimed in claim 1, wherein the feedback relates to transmissions made over one of: a data channel; or a control channel.

12. An apparatus comprising:
at least one processor; and
at least one memory including computer program code,
wherein the at least one memory and the computer program code are configured to, with the at least one processor, cause the apparatus to perform operations comprising:
receiving, at a base station and from user equipment, feedback relating to a transmission slot, wherein there are multiple types of transmission slots;
subsequently determining a type of transmission slot to which the feedback relates;
determining by the base station which type of transmission slot will be used at a particular time for communication with the user equipment;
determining by the base station at least one communication link parameter in dependence on the type of transmission slot to be used at the particular time and the received feedback, which has been determined to relate to that type of transmission slot; and
performing, by the base station and to the user equipment, a communication at the particular time, at least by using the determined at least one communication link parameter.

13. The apparatus according to claim 12, wherein the apparatus determines the type of transmission slot using a record linking a type of transmission slot to transmission time.

14. The apparatus according to claim 12, wherein the at least one memory and the computer program code are further configured to, with the at least one processor, cause the apparatus to perform operations comprising:
stamping the feedback so as to indicate the determined type of transmission slot; and
storing the feedback with the stamp.

15. The apparatus according to claim 12, wherein the at least one memory and the computer program code are further configured to, with the at least one processor, cause the apparatus to:
storing the feedback in dependence on result of the determining step, wherein feedback relating to a first type of transmission slot is stored separately to feedback relating to a second type of transmission slot.

16. The apparatus according to claim 12, wherein the at least one communication link parameter is at least one of: a modulation type; a coding scheme; and a Multiple Input-Multiple-Output Mode.

17. The apparatus according to claim 12, wherein the apparatus determines the type of transmission slot by determining whether the received feedback relates to either a regular data transmission slot or a muted data transmission slot.

18. The apparatus according to claim 12, wherein the received feedback indicates a channel quality of a particular communication channel during the transmission slot relative to a predetermined scale or forms part of a Hybrid Automatic Repeat Request mechanism.

19. The apparatus according to claim 18, wherein the received feedback forms part of a Hybrid Automatic Request mechanism and the at least one memory and the computer program code are further configured to, with the at least one processor, cause the apparatus to perform operations comprising:
correcting a previously stored indication of channel quality in dependence on the received feedback; and
using the corrected indication to determine communication link parameters to be used at the particular time.

20. The apparatus as claimed in claim 12, wherein the apparatus determines the type of transmission slot in dependence on at least one of: a determination that the received feedback was provided by user equipment that is not configured to distinguish between type of transmission slot when determining feedback; and determining that the received feedback was provided by user equipment that is not configured to distinguish between physical resource blocks when determining feedback.

21. The apparatus as claimed in claim 12, wherein the feedback relates to transmissions made over one of a data channel; or a control channel.

22. The apparatus as claimed in claim 12, wherein determining the type of transmission slot comprises determining at least one of: whether the transmission slot is associated with an Almost Blank Subframe or a non-Almost Blank Subframe; and whether the transmission slot is associated with a muted Physical Resource Block or a regular Physical Resource Block.

23. A computer program product comprising a non-transitory computer readable medium
- receiving, at a base station and from user equipment, feedback relating to a transmission slot, wherein there are multiple types of transmission slots;
- subsequently determining by the base station a type of transmission slot to which the feedback relates;
- determining by the base station which type of transmission slot will be used at a particular time for communication with the user equipment;
- determining by the base station at least one communication link parameter in dependence on the type of transmission slot to be used at the particular time and the received feedback, which has been determined to relate to that type of transmission slot; and
- performing, by the base station and to the user equipment, a communication at the particular time, at least by using the determined at least one communication link parameter.

* * * * *

UNITED STATES PATENT AND TRADEMARK OFFICE
CERTIFICATE OF CORRECTION

| | |
|---|---|
| PATENT NO. | : 9,813,194 B2 |
| APPLICATION NO. | : 14/896955 |
| DATED | : November 7, 2017 |
| INVENTOR(S) | : Ioannis Maniatis and Hans Kroener |

Page 1 of 1

It is certified that error appears in the above-identified patent and that said Letters Patent is hereby corrected as shown below:

In Claim 7:
Column 19, Line 26, "type" should be deleted.

In Claim 23:
Column 21, Line 9, "readable medium" should be deleted and --program product comprising program code adapted to cause a data processing apparatus, in response to loading and execution of the program code, to perform operations comprising-- should be inserted.

Signed and Sealed this
Twenty-sixth Day of December, 2017

Joseph Matal
*Performing the Functions and Duties of the
Under Secretary of Commerce for Intellectual Property and
Director of the United States Patent and Trademark Office*